US012577374B2

(12) United States Patent
Mooney et al.

(10) Patent No.: US 12,577,374 B2
(45) Date of Patent: Mar. 17, 2026

(54) CONTAINER FOR, AND A PACK INCLUDING, CYANOACRYLATE COMPOSITION(S)

(71) Applicant: Henkel AG & Co. KGaA, Duesseldorf (DE)

(72) Inventors: Aine Mooney, Northbrook (IE); Tammy Gernon, Dublin (IE); Susan Reilly, County Kildare (IE); Martin Smyth, Dublin (IE); Deborah Moore, Dublin (IE); Michael Jordan, Dublin (IE); Patricia Hedderman, Dublin (IE); Bryan Brady, Dublin (IE); Lydie Coulombel, Dublin (IE); Henry Loughrey, Kildare (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 687 days.

(21) Appl. No.: 17/844,657

(22) Filed: Jun. 20, 2022

(65) Prior Publication Data

US 2023/0034325 A1 Feb. 2, 2023

Related U.S. Application Data

(63) Continuation of application No. PCT/EP2020/085137, filed on Dec. 8, 2020.

(30) Foreign Application Priority Data

Dec. 20, 2019 (GB) ..................................... 1918957

(51) Int. Cl.
*C08K 5/3475* (2006.01)
*B65D 81/30* (2006.01)
*C08K 5/00* (2006.01)

(52) U.S. Cl.
CPC ............ *C08K 5/3475* (2013.01); *B65D 81/30* (2013.01); *C08K 5/005* (2013.01)

(58) Field of Classification Search
None
See application file for complete search history.

(56) References Cited

U.S. PATENT DOCUMENTS

| | | | |
|---|---|---|---|
| 4,556,700 A | 12/1985 | Harris et al. | |
| 4,622,414 A | 11/1986 | Mckervey | |
| 4,695,615 A | 9/1987 | Leonard et al. | |
| 4,718,966 A | 1/1988 | Harris et al. | |
| 4,837,260 A | 6/1989 | Sato et al. | |
| 4,855,461 A | 8/1989 | Harris et al. | |
| 5,530,037 A | 6/1996 | Mcdonnell et al. | |
| 6,607,632 B1 | 8/2003 | Mcdonnell et al. | |
| 2002/0028861 A1 * | 3/2002 | Andrews .............. | C08K 5/3492 524/106 |
| 2005/0005285 A1 | 1/2005 | Olson et al. | |
| 2021/0086429 A1 | 3/2021 | Miyawaki et al. | |

FOREIGN PATENT DOCUMENTS

| | | | |
|---|---|---|---|
| CN | 1427866 | A | 7/2003 |
| JP | H05305975 | A | 11/1993 |
| JP | 2003119356 | A | 4/2003 |
| JP | 2003119357 | A | 4/2003 |
| JP | 2003522242 | A | 7/2003 |
| JP | 2004026853 | A | 1/2004 |
| JP | 2016120682 | A | 7/2016 |
| JP | 2019043603 | A | 3/2019 |
| KR | 19980033774 | A | 8/1998 |
| KR | 20140093008 | A | 7/2014 |
| TW | 200506928 | A | 2/2005 |
| WO | 0055255 | A2 | 9/2000 |
| WO | 0157124 | A2 | 8/2001 |
| WO | 03070819 | A1 | 8/2003 |

OTHER PUBLICATIONS

G.H. Millet, "Cyanoacrylate Adhesives" in Structural Adhesives: Chemistry and Technology, S.R. Hartshorn, ed., Plenum Press, New York, p. 249-307 (1986).

H.V. Coover, D.W. Dreifus and J.T. O'Connor, "Cyanoacrylate Adhesives" in Handbook of Adhesives, 27, 463-77, I. 2 Skeist, ed., Van Nostrand Reinhold, New York, 3rd ed. (1990).

* cited by examiner

*Primary Examiner* — Yan Lan
(74) *Attorney, Agent, or Firm* — Steven C. Bauman

(57) ABSTRACT

A container for curable cyanoacrylate composition comprising:
a reservoir for holding curable cyanoacrylate composition, the reservoir having an outlet through which the curable cyanoacrylate composition can be dispensed;
the reservoir being defined by walls of plastics material, the plastics material being formed by a polymer material that is transmissive to both visible light and UV light; and
a UV blocking agent dispersed in the plastics material the UV blocking agent comprising at least one benzotriazole;
the walls of the container being transmissive to visible light and non-transmissive to UV light. Curable cyanoacrylate compositions held within such a container are thus storage stable in ambient conditions and yet the curable cyanoacrylate compositions can be seen through the walls of the container. A pack comprising the container and a curable cyanoacrylate composition is also described.

19 Claims, No Drawings

CONTAINER FOR, AND A PACK INCLUDING, CYANOACRYLATE COMPOSITION(S)

FIELD

The present invention relates to a container for curable cyanoacrylate compositions and a pack comprising (i) a container for curable cyanoacrylate compositions and (ii) a curable cyanoacrylate composition held within the container.

BACKGROUND

Curable cyanoacrylate compositions tend not to be storage stable when exposed to ambient light. For example, curable cyanoacrylate compositions will typically gel and turn solid within several weeks when exposed to ambient light such as window-filtered sunlight (sunlight through a glass window of a building). As a result, curable cyanoacrylate compositions have been sold in a pack comprising (i) a container for curable cyanoacrylate compositions and (ii) a curable cyanoacrylate composition held within the container where the container is. For example, certain curable cyanoacrylate products are sold in packs comprising plastic bottles. The bottles may be coloured/opaque or sold in an opaque secondary pack.

Some curable cyanoacrylate compositions are sold in packs comprising transparent containers, but the curable cyanoacrylate compositions tend not to be storage stable when such containers are exposed to ambient light. Accordingly, any such pack is often labelled with a requirement to be stored away from light sources for example the pack may be labelled with a requirement to store in a fridge. If such requirements are not followed the curable cyanoacrylate composition will cure prematurely within its container.

A further issue that arises is that curable cyanoacrylate compositions tend to be quite sensitive, relative to other curable compositions, in that initiation of cure can occur easily. Materials that cause premature cure of curable cyanoacrylate compositions are often said to be non-compatible with curable cyanoacrylate compositions. Accordingly, materials that are compatible (do not cause premature cure) with other curable compositions are not compatible (do cause premature cure) with curable cyanoacrylate compositions. So, materials that are compatible with curable cyanoacrylate compositions are the exception rather than the rule. Because of this compatibility problem, materials used for containers for curable cyanoacrylate compositions tend to be much more limited than for other curable compositions. The skilled person knows that the more reactive/less inert a material is, the more likely it is to be non-compatible with curable cyanoacrylate compositions.

SUMMARY

The present invention provides a plastics container for holding curable cyanoacrylate compositions that is (i) transmissive to visible light; (ii) non-transmissive to UV light; and (iii) compatible with curable cyanoacrylate compositions. Curable cyanoacrylate compositions held within such a container are thus storage stable in ambient conditions and yet the curable cyanoacrylate compositions can be seen through the walls of the container.

The present invention thus provides a clear plastics container that is (i) transmissive to visible light; (ii) non-transmissive to UV light; and (iii) compatible with curable cyanoacrylate compositions.

Indeed, the container of the invention is comparable in performance to a completely opaque plastics container.

The container of the invention can be of any suitable volume to accommodate a desired amount of curable cyanoacrylate composition, for example 5 g; 20 g; 50 g; 100 g; 500 g; 1 kg; and 2 kg.

The present invention provides a container for curable cyanoacrylate composition comprising:

a reservoir for holding curable cyanoacrylate composition, the reservoir having an outlet through which the curable cyanoacrylate composition can be dispensed;

the reservoir being defined by walls of plastics material, the plastics material being formed by a polymer material that is transmissive to both visible light and UV light; and a UV blocking agent dispersed in the plastics material the UV blocking agent comprising at least one benzotriazole;

the walls of the container being transmissive to visible light and non-transmissive to UV light.

The at least one benzotriazole (used as UV blocking agent) may comprise one or more benzotriazoles selected from compounds of the formula I:

Formula I

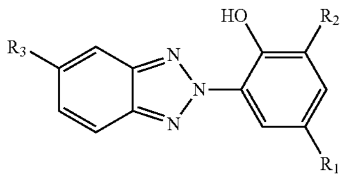

wherein:

$R_1$ is selected from H, an alkyl group having 1 to 20 carbon atoms, for example having 20 carbon atoms, or an alkyl-aryl group having 7 to 39 carbon atoms;

$R_2$, which may be the same or different as $R_1$; is selected from H, an alkyl group having 1 to 20 carbon atoms, or an alkyl-aryl group having 7 to 39 carbon atoms $R_3$ is H, Cl or Br.

In the compounds of Formula I, an alkyl group of $R_1$ and/or $R_2$ may have 1 to 8 carbon atoms, such as 1 to 5 carbon atoms, desirably 1 to 4 carbon atoms.

In the compounds of Formula I, an alkyl-aryl group of $R_1$ and/or $R_2$ may have 7 to 20 carbon atoms, suitably 7 to 9 carbon atoms.

In the compounds of Formula I, $R_1$ or $R_2$ may be independently selected from:

—H;

$—CH_3$;

$—C(CH_3)_3$;

$—C(CH_3)_2C_2H_5$;

$—C(CH_3)_2CH_2C(CH_3)_3$; and $—C(CH_3)_2C_6H_5$.

In the compounds of Formula I, desirably at least one of $R_1$ and $R_2$ is tert-butyl (also denoted as t-butyl and having structure $—C(CH_3)_3$).

In the compounds of Formula I desirably $R_3$ is selected from H or Cl.

The at least one benzotriazole may comprise (CAS 3896-11-5) 2-tert-butyl-6-(5-chloro-2H-benzotriazole-2-yl)-4-methylphenol,

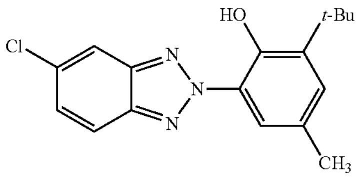 [SMILES: Cc1cc(-n2nc3ccc(Cl)cc3n2)c(O)c(C(C)(C)C)c1]

The at least one benzotriazole may comprise (CAS 3864-99-1) 2,4-di-tert-butyl-6-(5-chloro-2H-benzotriazol-2-yl) phenol,

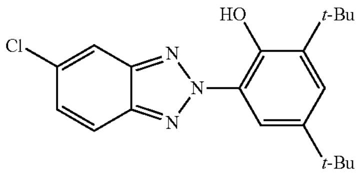 [SMILES: CC(C)(C)c1cc(-n2nc3ccc(Cl)cc3n2)c(O)c(C(C)(C)C)c1]

The at least one benzotriazole may comprise (CAS 25973-55-1) 2-(2H-benzotriazol-2-yl)-4,6-di-tert-pentylphenol,

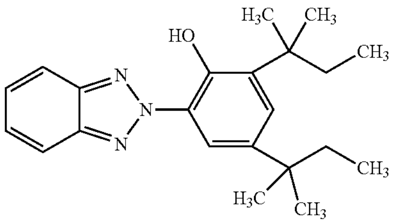 [SMILES: CCC(C)(C)c1cc(-n2nc3ccccc3n2)c(O)c(C(C)(C)CC)c1]

The at least one benzotriazole may comprise (CAS 3147-75-9) 2-(2H-benzotriazol-2-yl)-4-(1,1,3,3-tetramethylbutyl) phenol,

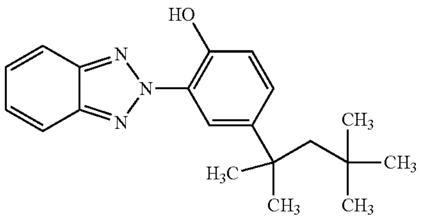 [SMILES: CC(C)(C)CC(C)(C)c1ccc(O)c(-n2nc3ccccc3n2)c1]

The at least one benzotriazole may comprise (CAS 73936-91-1) 2-(2H-benzotriazol-2-yl)-6-(1-methyl-1-phenylethyl)-4-(1,1,3,3-tetramethylbutyl)phenol,

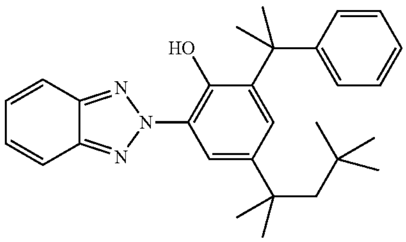 [SMILES: CC(C)(C)CC(C)(C)c1cc(-n2nc3ccccc3n2)c(O)c(C(C)(C)c2ccccc2)c1]

Desirably in a container of the invention the polymer material is a polyolefin material.

Suitably the polymer material is polyethylene, for example HDPE (high density polyethylene).

Suitably the polymer material is PP (polypropylene).

In a container of the invention the UV blocking agent may be dispersed in the plastics material at an amount of from about 0.05% to about 0.3% by weight.

Desirably an antioxidant agent is dispersed in the plastics material. The antioxidant agent may prevent discolouring otherwise imparted by the processing of the material. For example, the thermal stressing of component materials during manufacture and processing may impart a yellowing to the plastics material and the antioxidant agent prevents such yellowing being imparted.

The antioxidant agent may be dispersed in the plastics material at an amount of from about 0.05% to about 0.3% by weight.

In a container of the invention the walls of the container are desirably non-transmissive to UV light up to 360 nm, such as up to 370 nm, for example up to 380 nm, suitably up to 390 nm, for example up to 395 nm.

The present invention also provides a pack comprising:

a container of the invention; and a curable cyanoacrylate composition held within the reservoir of the container.

The present invention thus provides a pack for storage of curable cyanoacrylate compositions.

The container of the present invention is compatible with a wide range of curable cyanoacrylate compositions including curable methyl, ethyl, allyl, betamethoxy ethyl, butyl, and octyl cyanoacrylate compositions.

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in Handbook of Adhesives, 27, 463-77, I. Skeist, ed., Van Nostrand Reinhold, New York, 3rd ed. (1990). See also G. H. Millet, "Cyanoacrylate Adhesives" in Structural Adhesives: Chemistry and Technology, S. R. Hartshorn, ed., Plenum Press, New York, p. 249-307 (1986).

The cyanoacrylate component includes at least one cyanoacrylate monomer which may be chosen with a raft of substituents, such as those represented by $H_2C{=}C(CN)$—COOR, where R is selected from $C_{1-15}$ alkyl, $C_{2-15}$ alkoxyalkyl, $C_{3-15}$ cycloalkyl, $C_{2-15}$ alkenyl, $C_{6-15}$ aralkyl, $C_{5-15}$ aryl, $C_{2-15}$ allyl and haloalkyl groups. Desirably, the cyanoacrylate monomer is selected from at least one of methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable cyanoacrylate monomer includes ethyl-2-cyanoacrylate.

The cyanoacrylate component should be included in the compositions in an amount within the range of from about 50% to about 99.98% by weight, with the range of about 70% to about 95% by weight, of the total composition being desirable.

Accelerators may be included in the inventive cyanoacrylate compositions, such as any one or more selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718, 966, and 4,855,461, the disclosures of each of which are hereby expressly incorporated herein by reference.

Of the silacrowns, again many are known, and are reported in the literature. For instance, a typical silacrown may be represented within the following structure:

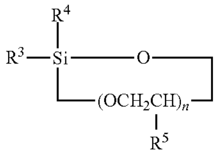

where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups, such as methoxy, and aryloxy groups, such as phenoxy. The $R^3$ and $R^4$ groups may contain halogen or other substituents, an example being trifluoropropyl. However, groups not suitable as $R^4$ and $R^5$ groups are basic groups, such as amino, substituted amino and alkylamino.

A host of crown ethers are known. For instance, examples which may be used herein either individually or in combination, or in combination with other first accelerator include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methyl-benzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an $\alpha$, $\beta$ or $\gamma$-cyclodextrin which is at least partly soluble in the cyanoacrylate would be appropriate choices.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g. U.S. Pat. Nos. 5,530,037 and 6,607,632, the disclosures of each of which are hereby incorporated herein by reference.

Commonly used free-radical stabilizers may be used including hydroquinone, methyl hydroquinone, butylated hydroxyanisole, butylated hydroxytoluene and 4-methoxyphenol, while commonly used anionic stabilizers include boron trifluoride, boron trifluoride-etherate, sulphur trioxide (and hydrolysis products thereof), sulfur dioxide and methane sulfonic acid.

Other additives may be included to confer additional physical properties, such as improved shock resistance (for instance, citric acid), thickness (for instance, polymethyl methacrylate), thixotropy (for instance fumed silica), colour, toughening agents, humidity additives, for example, phthalic anhydride, and heat resistant additives such as pentafluorobenzonitrile, and 3,4,5,6-tetrahydrophthalic anhydride.

DESCRIPTION

An initial study was carried out to compare the performance of an opaque 20 g Black UV bottle (A) and a transparent 20 g Sigma bottle (B) to that of two new packs (C and D) formed with the same HDPE base resin as the transparent 20 g sigma bottle but with the addition of two different masterbatches containing different Ultraviolet (UV) blocking agents. A and B are packs for curable cyanoacrylate compositions which are commercially sold. A is a container which is co-extruded in two layers, with an opaque outer layer to provide protection for UV sensitive materials, whereas B is a transparent container that is transmissive to UV light. The term "20 g" refers to 20 g of curable cyanoacrylate composition within the container.

For C a masterbatch consisting of 2-hydroxy-4-(octyloxy) benzophenone in a polyethylene carrier was added at a let-down ratio (LDR) of 2%. 2-Hydroxy-4-(octyloxy)benzophenone is a broad-spectrum UV blocking agent.

For D a masterbatch consisting of 2-tert-Butyl-6-(5-chloro-2H-benzotriazol-2-yl)-4-methylphenol in a polyethylene carrier was added at a let-down ratio (LDR) of 1.5%. 2-ert-Butyl-6-(5-chloro-2H-benzotriazol-2-yl)-4-methylphenol is a red-shifted broad-spectrum UV blocking agent.

The UV transmission of packs A to D was evaluated, by UV-Vis spectroscopy and results are summarized in Table 1 below.

TABLE 1

| | Description | UV blocking agent contained in masterbatch: | UV Transmission from |
|---|---|---|---|
| A | Opaque 20 g Black UV Bottle | None added (bottle is opaque). | None |
| B | Transparent 20 g Sigma Bottle | None added (bottle is transmissive to visible and UV light) | 235 nm |
| C | Transparent 20 g Sigma Bottle with added UV blocking agent | CAS 1843-05-6 2-Hydroxy-4-octyloxybenzophenone | 369 nm |
| D | Transparent 20 g Sigma Bottle with added UV blocking agent | CAS 3896-11-5 2-tert-Butyl-6-(5-chloro-2H-benzotriazol-2-yl)-4-methylphenol | 395 nm |

UV light consists of radiation below 400 nm, with radiation of shorter wavelength having higher energy.

Pack A is opaque and therefore no UV light is transmitted through the packaging.

Pack B, which is the current transparent pack used for Loctite® cyanoacrylate products, transmits UV light from 235 to 400 nm. Thus, damaging high energy, short wavelength UV light can reach the curable cyanoacrylate product within.

Pack C blocks most of this damaging UV light, however it does transmit UV light from 369 nm upwards.

Pack D is more effective in blocking UV light, only transmitting UV light from 395 nm upwards.

Testing was carried out with each pack using Loctite® 401. Loctite® 401 is a grade of ethyl cyanoacrylate-based adhesive. It is a low viscosity, fast curing, one-part liquid ethyl cyanoacrylate adhesive that is suitable for bonding porous materials and has a transparent, colorless to straw colored appearance.

Two key properties were investigated for this formulation in each pack type: (i) stability when exposed to window-filtered sunlight and (ii) thermal stability after ageing at 82° C.

(i) Stability when Exposed to Window-Filtered Sunlight

Table 2 summarizes the results from the stability testing when exposed to window-filtered sunlight (through a glass window of a building) by placing the container on a windowsill inside the window. After 4 weeks at this condition, the viscosity of Loctite® 401 in Pack A has not changed. In contrast, the viscosities in pack B and C have increased, with viscosity ratios of 1.54 and 1.48, respectively. There is a slight increase in viscosity in Pack D, however this is minimal at a viscosity ratio of 1.09 after 4 weeks.

TABLE 2

| | Initial | 2 weeks exposure to window-filtered sunlight | | 4 weeks exposure to window-filtered sunlight | |
|---|---|---|---|---|---|
| Pack | Viscosity at 25° C. (mPa · s) | Viscosity at 25° C. (mPa · s) | Viscosity Ratio | Viscosity at 25° C. (mPa · s) | Viscosity Ratio |
| A | 87.2 | 83.5 | 0.96 | 82.7 | 0.95 |
| B | | 105.3 | 1.21 | 134 | 1.54 |
| C | | 98.8 | 1.13 | 129 | 1.48 |
| D | | 87.8 | 1.01 | 95.7 | 1.09 |
| B with front and back label | | 95.2 | 1.09 | 106 | 1.22 |
| C with front and back label | | 91.5 | 1.05 | 106 | 1.22 |
| D with front and back label | | 89.9 | 1.03 | 89 | 1.02 |

Packs B, C and D were also tested with a label covering 12.4 $cm^2$ on both the front and back of the pack to give a more realistic representation of Loctite® cyanoacrylate products on the market. Pack A was not tested with labels as this pack is completely opaque.

Packs B and C show an increase in viscosity, with a ratio of 1.22 after 4 weeks. Viscosity was measured using a cone and plate rheometer at a shear-rate of 3000 $s^{-1}$ at 25° C.

The viscosity ratio is the ratio of the aged viscosity to the initial viscosity (initial viscosity=viscosity before exposure).

There is no change in viscosity for Pack D after 4 weeks at this condition.

No changes in product performance properties (fixture time, tensile lap-shear strength) were observed after 4 weeks exposure to window-filtered sunlight in each pack (Table 3). Fixture time (in seconds "s") on lap shear specimens is defined as the time to develop a shear strength of 0.1 $N/mm^2$ and was measured at 22° C. and 50% relative humidity. Tensile lap-shear strength (in $N/mm^2$) was measured according to ISO 4587:2003.

Lap shears used:
MS=mild steel
Al=aluminium
PC=polycarbonate
PVC=polyvinylchloride
GBMS=grit blasted mild steel.

TABLE 3

| | Fixture Time (s) | | | | Lap Shear Strength ($N/mm^2$) GBMS 24 hRTC | Lap Shear Strength ($N/mm^2$) PC 24 hRTC | Heat Ageing ($N/mm^2$) GBMS 1000 h at 120° C. |
|---|---|---|---|---|---|---|---|
| | MS | Al | PC | PVC | | | |
| A | <10 | <10 | 10-20 | <10 | 18.2 ± 2.1 | 6.3 ± 0.6 | 8.0 ± 2.3 |
| B | <10 | <10 | <10 | <10 | 16.7 ± 1.0 | 4.4 ± 0.3 | 4.2 ± 3.3 |
| C | <10 | <10 | <10 | <10 | 16.9 ± 0.7 | 5.1 ± 0.6 | 6.6 ± 3.9 |
| D | <10 | <10 | <10 | <10 | 16.4 ± 0.4 | 4.7 ± 0.7 | 7.5 ± 4.4 |
| B with front and back label | <10 | <10 | <10 | <10 | 16.2 ± 2.0 | 6.7 ± 0.4 | 6.3 ± 3.6 |
| C with front and back label | <10 | <10 | <10 | <10 | 16.5 ± 0.9 | 6.2 ± 1.0 | 8.7 ± 3.2 |
| D with front and back label | <10 | <10 | <10 | <10 | 18.1 ± 0.3 | 5.9 ± 0.4 | 10.8 ± 0.4 |

In the data presented herein, h=hours; RTC=room temperature conditions, so for example "24 hRTC"=24 hours at room temperature conditions.

(ii) Thermal Stability after Ageing at 82° C.

The compatibility of each pack type with Loctite® 401 was also investigated by thermal ageing at 82° C. (see Table 4). After 3 days at 82° C. packs A, B and D all showed good compatibility with the formulation, with viscosity ratios all below 3. However, a viscosity ratio of 3.9 was determined for the formulation in pack C. After a further 3 days at 82° C., the formulation in pack C had gelled solid.

TABLE 4

| | 3 days at 82° C. | | | 6 days at 82° C. | | |
|---|---|---|---|---|---|---|
| | Appearance | Viscosity at 25° C. (mPa · s) | Viscosity Ratio | Appearance | Viscosity at 25° C. (mPa · s) | Viscosity Ratio |
| A | Colourless | 186 | 2.1 | Colourless | 380 | 4.4 |
| B | Colourless | 177 | 2 | Colourless | 353 | 4 |
| C | Colourless | 344 | 3.9 | Colourless | Gelled Solid | Gelled Solid |
| D | Colourless | 181 | 2.1 | Colourless | 388 | 4.4 |

These results demonstrate that it is possible to incorporate UV blocking agents into the resin used for the transparent cyanoacrylate packaging. These UV blocking agents block the transmission of high energy short wavelength UV radiation, as expected.

However, only the benzotriazole-type UV blocking agent is effective in protecting the Loctite® 401 within the pack, preventing an increase in viscosity when exposed to window-filtered sunlight.

Only the benzotriazole-type UV blocking agent is compatible with the cyanoacrylate formulation. This is surprising. Given the generally reactive nature of benzotriazoles it is surprising that they do not cause premature cure of curable cyanoacrylate compositions.

In comparison to the opaque Black UV bottle, pack D is as effective in protecting cyanoacrylates from UV light, and it is transparent.

A further study was carried out with Loctite® 401 in Pack B, the transparent 20 g sigma bottle and Pack E, where the masterbatch consisting of 2-tert-Butyl-6-(5-chloro-2H-benzotriazol-2-yl)-4-methylphenol in an polyethylene carrier was added at a let-down ratio (LDR) of 1.0% to the base HDPE resin (see Table 5 below).

TABLE 5

| Pack | Description | UV blocking agent | UV Transmission from |
|---|---|---|---|
| B | Transparent 20 g Sigma Bottle | None | 235 nm |
| E | Transparent 20 g Sigma Bottle with UV blocking agent and antioxidant | CAS 3896-11-5 2-tert-Butyl-6-(5-chloro-2H-benzotriazol-2-yl)-4-methylphenol | 395 nm |

The samples were exposed to continuous light in the Q-SUN Xe-1 Xenon Arc test chamber for a defined time period. The Q-SUN Xe-1 provides an excellent simulation of both direct and indirect sunlight in accordance with ASTM G-155. The spectrum of light emitted by the Q-SUN Xe-1 is approximately equivalent to noon, midsummer sunlight in the northern hemisphere. When the Q-Sun Xe-1 is fitted with a Window-Q filter, the light emitted in the test chamber is approximately equivalent to direct sunlight coming through a piece of single-strength, single-pane glass. Table 6 below outlines the exposure conditions in the Q-SUN Xe-1 used for this study.

TABLE 6

| Standard Q-SUN Exposure Conditions | |
|---|---|
| Filter | Window-Q (UV cut-on of 310 nm) |
| Irradiance | 10 $W/m^2/nm$ |
| Irradiance Control Point | 420 nm |
| Black Panel Temperature | 22° C. |

The appearance of Loctite® 401 in Packs B and E was monitored after exposure in the Q-SUN over defined time periods. After each time point, the appearance was recorded, and results are summarized in Table 7 below. Loctite® 401 in pack B was found to be gelled solid after 18 hours exposure in the Q-SUN. In contrast, Loctite® 401 in pack E, was a clear, colourless liquid even after 65 hours exposure in the Q-SUN.

TABLE 7

| | Loctite ® 401 in Pack B | Loctite ® 401 in Pack E |
|---|---|---|
| 0 hours exposure | Clear, colourless liquid | Clear, colourless liquid |
| 12 hours exposure | Clear, colourless liquid | Clear, colourless liquid |
| 15 hours exposure | Clear, colourless liquid | Clear, colourless liquid |
| 18 hours exposure | Gelled solid | Clear, colourless liquid |
| 20 hours exposure | — | Clear, colourless liquid |
| 30 hours exposure | — | Clear, colourless liquid |
| 40 hours exposure | — | Clear, colourless liquid |
| 50 hours exposure | — | Clear, colourless liquid |
| 60 hours exposure | — | Clear, colourless liquid |
| 65 hours exposure | — | Clear, colourless liquid |

The viscosity, fixture time and lap shear strength of this Loctite® 401 was tested after 65 hours Q-SUN exposure in pack E. Results are summarized in Table 8 below. The viscosity had not increased significantly, and the fixture time and tensile lap shear strength all met the required product specifications.

TABLE 8

| | Loctite ® 401 |
|---|---|
| Pack Type | E |
| Q-SUN Exposure Time | 65 hours |
| Appearance | Clear & colourless |
| Viscosity at 25° C. (mPa · s) | 99.4 |
| Viscosity Ratio | 1.02 |
| Fixture on MS (s) | <10 |
| Fixture on PC (s) | <10 |
| Lap Shear Strength GBMS 24 hRTC ($N/mm^2$) | 17.22 ± 0.59 |
| Lap Shear Strength PC 24 hRTC ($N/mm^2$) | 7.96 ± 0.71 |

After demonstrating the UV protective properties of Pack E compared to Pack B, a compatibility study with a range of commercially available Loctite® products was carried out to confirm the suitability of Pack E as a commercial pack for these products.

Loctite® 403 is a grade of beta-methoxy ethyl cyanoacrylate-based adhesive. It is a medium viscosity, fast curing, low odor/low bloom one-part liquid beta-methoxy ethyl cyanoacrylate adhesive and has a transparent, colorless to pale yellow appearance.

Loctite® 406 is a grade of ethyl cyanoacrylate-based adhesive. It is a low viscosity, wicking, fast curing, one-part liquid ethyl cyanoacrylate adhesive and has a transparent, colorless to straw colored appearance.

Loctite® 424 is a grade of ethyl cyanoacrylate-based adhesive. It is a low viscosity, general purpose, fast curing, one-part liquid ethyl cyanoacrylate adhesive and has a transparent, colorless to straw colored appearance.

Loctite® 435 is a grade of rubber toughened ethyl cyanoacrylate-based adhesive. It is a low viscosity, fast curing, rubber toughened one-part liquid ethyl cyanoacrylate adhesive and has a colorless to straw colored, slightly cloudy appearance.

Loctite® 460 is a grade of beta-methoxy ethyl cyanoacrylate-based adhesive. It is a low viscosity, fast curing, low odor/low bloom one-part liquid beta-methoxy ethyl cyanoacrylate adhesive and has a transparent, colorless to straw colored appearance.

Loctite® 480 is a grade of rubber toughened ethyl cyanoacrylate-based adhesive. It is a low viscosity, fast curing, rubber toughened one-part liquid ethyl cyanoacrylate adhesive and has a black appearance.

Loctite® 495 is a grade of ethyl cyanoacrylate-based adhesive. It is a low viscosity, general purpose, fast curing, one-part liquid ethyl cyanoacrylate adhesive and has a transparent, colorless to straw colored appearance.

Loctite® 4850 is a grade of ethyl and butyl cyanoacrylate-based adhesive. It is a medium viscosity, fast curing, flexible one-part liquid ethyl and butyl cyanoacrylate adhesive and has a transparent, colorless to straw colored appearance.

Loctite® 4062 is a grade of ethyl cyanoacrylate-based adhesive. It is a very low viscosity, fast curing, one-part liquid ethyl cyanoacrylate adhesive and has a transparent, colorless to straw colored appearance.

Thermal ageing studies were carried out with these Loctite® products in Pack B and E, at 82° C., and the results are summarized in Table 9 below. The stability of the Loctite® product grades tested in Pack E was found to be comparable to the stability in Pack B, after 3 days at 82° C.

TABLE 9

| | Initial | 3 days at 82° C. | | |
|---|---|---|---|---|
| Product | Viscosity @ 25° C. (mPa · s) | Pack | Viscosity @ 25 °C (mPa · s) | Viscosity Ratio |
| Loctite ® 403 | 1040 | B | 1170 | 1.13 |
| | | E | 1180 | 1.13 |
| Loctite ® 406 | 18.2 | B | 26.4 | 1.45 |
| | | E | 28.8 | 1.58 |
| Loctite ® 424 | 91 | B | 109 | 1.20 |
| | | E | 114 | 1.25 |
| Loctite ® 435 | 128 | B | 162 | 1.27 |
| | | E | 171 | 1.34 |
| Loctite ® 460 | 30.8 | B | 38.3 | 1.24 |
| | | E | 39.2 | 1.27 |
| Loctite ® 480 | 133 | B | 164 | 1.23 |
| | | E | 168 | 1.26 |
| Loctite ® 495 | 34.8 | B | 45.9 | 1.32 |
| | | E | 49.4 | 1.42 |

TABLE 9-continued

| | Initial | 3 days at 82° C. | | |
|---|---|---|---|---|
| Product | Viscosity @ 25° C. (mPa · s) | Pack | Viscosity @ 25 °C (mPa · s) | Viscosity Ratio |
| Loctite ® 4062 | 1.22 | B | 1.33 | 1.09 |
| | | E | 1.42 | 1.16 |
| Loctite ® 4850 | 327 | B | 354 | 1.08 |
| | | E | 412 | 1.26 |

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A curable cyanoacrylate composition holding container comprising a curable cyanoacrylate composition:

a reservoir for holding curable cyanoacrylate composition, the reservoir having an outlet through which the curable cyanoacrylate composition can be dispensed;

the reservoir being defined by walls of plastics material;

the plastics material being formed by a polymer material that is transmissive to both visible light and UV light;

a UV blocking agent dispersed in the plastics material, the UV blocking agent comprising at least one benzotriazole; and the walls of the container being transmissive to visible light and non-transmissive to UV light, wherein the at least one benzotriazole is one or more benzotriazoles selected from compounds of the formula I:

Formula I

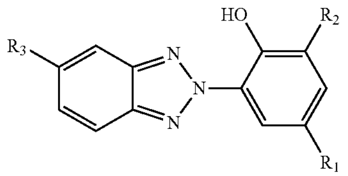

wherein:

$R_1$ and $R_2$ are independently selected from: —H; —$CH_3$; —$C(CH_3)_3$; —$C(CH_3)_2C_2H_5$; —$C(CH_3)_2CH_2C(CH_3)_3$; and —$C(CH_3)_2C_6H_5$, and $R_3$ is H, Cl or Br.

2. A container according to claim 1 wherein in the compounds of Formula I, at least one of $R_1$ and $R_2$ is tert-butyl.

3. A container according to claim 1 wherein the at least one benzotriazole is (CAS 3896-11-5) 2-tert-butyl-6-(5-chloro-2H-benzotriazole-2-yl)-4-methylphenol,

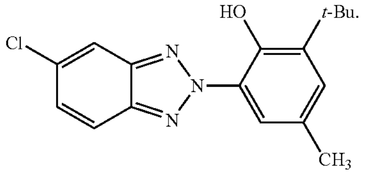 [SMILES: Cc1cc(-n2nc3ccc(Cl)cc3n2)c(O)c(C(C)(C)C)c1]

4. A container according to claim 1 wherein the at least one benzotriazole is (CAS 3864-99-1) 2,4-di-tert-butyl-6-(5-chloro-2H-benzotriazol-2-yl) phenol

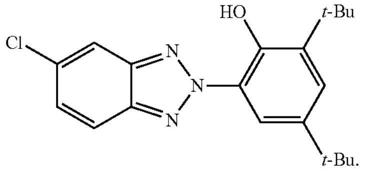 [SMILES: CC(C)(C)c1cc(-n2nc3ccc(Cl)cc3n2)c(O)c(C(C)(C)C)c1]

5. A container according to claim 1 wherein the at least one benzotriazole is (CAS 25973-55-1) 2-(2H-benzotriazol-2-yl)-4,6-di-tert-pentylphenol

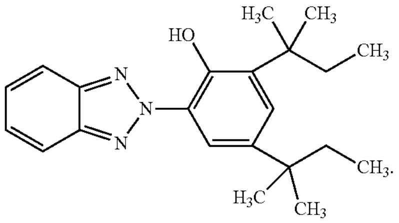 [SMILES: CCC(C)(C)c1cc(-n2nc3ccccc3n2)c(O)c(C(C)(C)CC)c1]

6. A container according to claim 1 wherein the at least one benzotriazole is (CAS 3147-75-9) 2-(2H-benzotriazol-2-yl)-4-(1,1,3,3-tetramethylbutyl) phenol

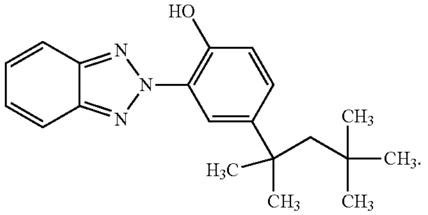 [SMILES: CC(C)(C)CC(C)(C)c1ccc(O)c(-n2nc3ccccc3n2)c1]

7. A container according to claim 1 wherein the at least one benzotriazole is (CAS 73936-91-1) 2-(2H-benzotriazol-2-yl)-6-(1-methyl-1-phenylethyl)-4-(1, 1,3,3-tetramethylbutyl) phenol

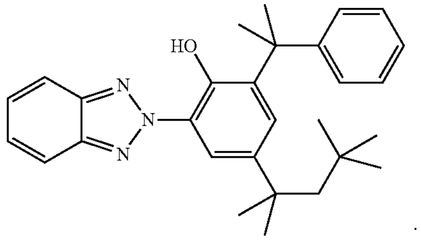 [SMILES: CC(C)(C)CC(C)(C)c1cc(-n2nc3ccccc3n2)c(O)c(C(C)(C)c2ccccc2)c1]

8. A container according to claim 1 wherein the polymer material is a polyolefin material.

9. A container according to claim 1 wherein the polymer material is polyethylene.

10. A container according to claim 9 wherein the polymer material is HDPE (high density polyethylene).

11. A container according to claim 1 wherein the polymer material is PP (polypropylene).

12. A container according to claim 1 wherein the UV blocking agent is dispersed in the plastics material at an amount of from about 0.05% to about 0.3% by weight.

13. A container according to claim 1 further comprising an antioxidant agent dispersed in the plastics material.

14. A container according to claim 13 wherein the antioxidant agent is dispersed in the plastics material at an amount of from about 0.05% to about 0.3% by weight.

15. A container according to claim 1 wherein the walls of the container are non-transmissive to UV light up to 360 nm.

16. A container according to claim 1 wherein the walls of the container are non-transmissive to UV light up to 370 nm.

17. A container according to claim 1 wherein the walls of the container are non-transmissive to UV light up to 380 nm.

18. A container according to claim 1 wherein the walls of the container are non-transmissive to UV light up to 390 nm.

19. A container according to claim 1 wherein the walls of the container are non-transmissive to UV light up to 395 nm.

* * * * *